US010171582B2

(12) United States Patent
Dictos et al.

(10) Patent No.: US 10,171,582 B2
(45) Date of Patent: Jan. 1, 2019

(54) METHOD AND APPARATUS FOR CLIENT TO CONTENT APPLIANCE (CA) SYNCHRONIZATION

(71) Applicant: BARRACUDA NETWORKS, INC., Campbell, CA (US)

(72) Inventors: Jason Dictos, Ypsilanti, MI (US); Aaron Kluck, Brighton, MI (US)

(73) Assignee: Barracuda Networks, Inc., Campbell, CA (US)

( * ) Notice: Subject to any disclaimer, the term of this patent is extended or adjusted under 35 U.S.C. 154(b) by 226 days.

(21) Appl. No.: 15/012,663

(22) Filed: Feb. 1, 2016

(65) Prior Publication Data

US 2016/0248753 A1  Aug. 25, 2016

Related U.S. Application Data

(60) Provisional application No. 62/119,696, filed on Feb. 23, 2015.

(51) Int. Cl.
*H04L 29/08* (2006.01)
*G06F 8/65* (2018.01)
*H04L 29/06* (2006.01)

(52) U.S. Cl.
CPC .......... *H04L 67/1095* (2013.01); *G06F 8/65* (2013.01); *H04L 67/06* (2013.01); *H04L 67/1097* (2013.01); *H04L 63/0807* (2013.01)

(58) Field of Classification Search
CPC ....... G06F 8/65; H04L 63/0807; H04L 67/06; H04L 67/1095; H04L 67/1097
See application file for complete search history.

(56) References Cited

U.S. PATENT DOCUMENTS

| 2008/0031265 | A1* | 2/2008 | Mullick | H04L 12/4641 370/401 |
| 2009/0182836 | A1* | 7/2009 | Aviles | H04L 41/0893 709/213 |
| 2013/0080765 | A1* | 3/2013 | Mohanty | H04L 63/0428 713/150 |
| 2014/0304804 | A1* | 10/2014 | Lee | H04L 63/0272 726/15 |
| 2015/0052105 | A1* | 2/2015 | Nguyen | G06F 17/30174 707/626 |

(Continued)

*Primary Examiner* — Joseph P Hirl
*Assistant Examiner* — Sayed Aresh Beheshti Shirazi

(57) ABSTRACT

A new approach is proposed that contemplates systems and methods to support file synchronization between a local host and a cloud storage via one or more local content appliances (CAs), wherein each content appliance is a storage device/host configured to locally maintain documents and files previously downloaded from the cloud storage. First, a client agent at the local host discovers and connects to the CA that manage its files locally. To access a file/document that is not cached on its local host, the client agent requests and receives the file from the CA instead of downloading it directly from the cloud storage. When parts of the file are updated locally by the client, the client agent is configured to transmit the updated file to the CA, wherein the updated file is considered as having been fully committed from the client's perspective. The CA then synchronizes with and uploads the revised file to the cloud storage and/or other CAs in the background.

36 Claims, 4 Drawing Sheets

(56) References Cited

U.S. PATENT DOCUMENTS

| | | | | |
|---|---|---|---|---|
| 2015/0052247 A1* | 2/2015 | Threefoot | ............... | H04L 67/10 709/225 |
| 2015/0278245 A1* | 10/2015 | Sagar | ................ | G06F 17/30174 707/610 |
| 2016/0072886 A1* | 3/2016 | Lin | ..................... | H04L 67/1097 709/213 |

* cited by examiner

METHOD AND APPARATUS FOR CLIENT TO CONTENT APPLIANCE (CA) SYNCHRONIZATION

CROSS-REFERENCE TO RELATED APPLICATIONS

This application claims the benefit of U.S. Provisional Patent Application No. 62/119,696, filed Feb. 23, 2015, and entitled "Client to Content Appliance (CA) Synchronization," which is incorporated herein in its entirety by reference.

BACKGROUND

For a long time the typical synchronization or sync and share application was defined as a system that is configured to download and upload files automatically to a client at a local computer host such as a desktop or a laptop computing device/machines. With more and more data being stored in a cloud storage these days, local storage allowances become an issue and some of the sync and share applications started to provide methods that provide users control over what files are to be downloaded to or uploaded from their local machines/systems to the cloud storage.

For corporations have a large amount of storage needs for data and files, accessing the files maintained in the cloud may impose a severe burden on the communication bandwidth between its local hosts and the cloud storage. The network traffic jam may be further exacerbated if the network connections at the local hosts are not always at the highest quality, causing severe delay for the users/clients at the local hosts to access their files that are not stored/cached locally on the local hosts. In addition, when more than one user need to access the same file maintained in the cloud storage, multiple copies of the same file may be requested and downloaded from the cloud storage even when one of the local hosts has already requested and downloaded a copy of the file, which further escalates the network congestion and requires de-duplication of files. Furthermore, the local client needs to keep on running during the entire process the local host communicating with the cloud storage.

It is thus desirable to provide a file synchronization approach for the local client that overcomes the limitations of the current designs and provides the users with instant access to all their files without requiring the files to be stored locally.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION OF EMBODIMENTS

Figure 1:
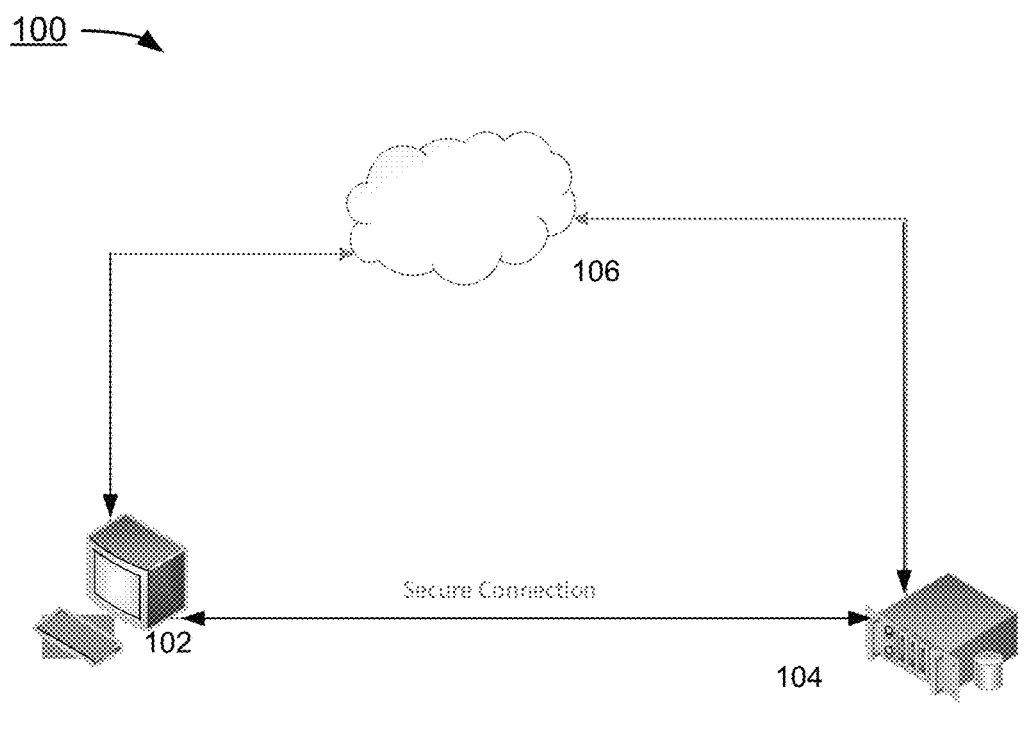
FIG. 1 depicts an example of a system diagram to support file synchronization and sharing with cloud storage via a content appliance in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to support file synchronization between a local host and a cloud storage (a global database or DB) via one or more local content appliances (CAs), wherein each content appliance is a storage device/host configured to locally maintain documents and files previously downloaded from the cloud storage. First, a client agent at the local host is configured to discover and connect to the CA(s) that manage its files locally. To access a file/document that is not cached on its local host, the client agent is configured to communicate with the local CA instead of requesting it directly from the cloud storage, wherein the local CA will request the file from the cloud storage or another CA if it does not have the file locally. When parts of the file are revised or updated locally by the client, the client agent is configured to transmit the updated file to the local CA, wherein the updates to the file are considered as having been fully committed from the client's perspective. The CA then synchronizes with and uploads the revised file to the cloud storage and/or other CAs in the background.

By utilizing a multi-tiered hybrid storage system that includes the CAs in addition to the local host of the client and the cloud storage, the proposed approach enables that any file (or parts of it) requested by the client agent is to be retrieved from the cloud storage only once by a CA. Such one-time file retrieval mechanism benefits the client (e.g., company) having a large scale file deployment in the cloud as the number of connections and communication bandwidth requirements for accessing the cloud-based files by the local client can be significantly mitigated. In fact, the more data (files and their metadata) and requests are directed to the CA by the local client agent, the better chance for file de-duplication and further bandwidth acceleration. In addition, the proposed approach provide user experience enhancements by offloading and delegating the file synchronization and uploading tasks to the CA without requiring the client agent to keep running on its local host (e.g., desktop or laptop), e.g., the client agent may go offline, while the file is synchronized to the cloud storage.

FIG. 1 depicts an example of a system diagram 100 to support file synchronization and sharing with cloud storage via a content appliance. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes one or more of client agents 102 running on one or more local machines/computing units/hosts, a content appliance (CA) 104, and a cloud storage (global DB) 106. Here, each local host can be a computing device, a communication device, a storage device, or any electronic device capable of running a software component. For non-limiting examples, a computing device can be but is not limited to a laptop PC, a desktop PC, an iPod, an iPhone, an iPad, a Google's Android device, or a server/host/machine. A storage device can be but is not limited to a hard disk drive, a flash memory drive, or any portable storage device.

In the example of FIG. 1, the components of system 100 are configured to communicate with each other following certain communication protocols, such as TCP/IP protocol, over one or more communication networks. Here, the communication networks can be but are not limited to, Internet, intranet, wide area network (WAN), local area network (LAN), wireless network, Bluetooth, WiFi, and mobile communication network. The physical connections of the network and the communication protocols are well known to those of skill in the art. The forms of information being communicated among the various parties listed above over the communication networks includes but is not limited to, emails, messages, web pages with optionally embedded objects (e.g., links to approve or deny the request).

In the example of FIG. 1, the system 100 adopts a multi-tiered hybrid storage mechanism that includes storage space on the lost host, the CA 104, and the cloud storage 106. Here, the CA 104 includes one or more local storage devices/servers dedicated to store and manage large-scale data and files of the client agent 102 but is physically separate from the local host of the client agent 102. The storage devices of the CA 104, available as a physical or virtual appliance, can be either onsite with the local host in the same internal network or offsite on the Internet. The CA 104 is configured to optimize access, performance and security for local and cloud-based file synchronization and sharing. In some embodiments, the CA 104 is configured to support local recovery for the client agent 102 to access its files even in the event of an external network outage when the access to the cloud storage 106 is not available. In some embodiments, the CA 104 functions as a "never full" cache for the client agent 102 by caching the most frequently used files locally as discussed in details later.

In the example of FIG. 1, the cloud storage 106 in FIG. 1 includes a plurality of servers configured to manage and store the files for the client agent 102 remotely in the cloud (on the Internet) at geographically distributed locations different from the locations of the local host of the client agent 102 and the CA 104. In some embodiments, each file under the multi-tiered hybrid storage mechanism can have only one authoritative and most up-to-date copy centrally maintained at the cloud storage 106, which can be accessed and synchronized with its local copies by the client agent 102 and the CA 104 over the communication network. In some embodiments, the cloud storage 106 further maintains information of the client agents 102s and/or the CA 104 (and the metadata of the files) that keep a local copy of each of the files it maintains.

Figure 2:
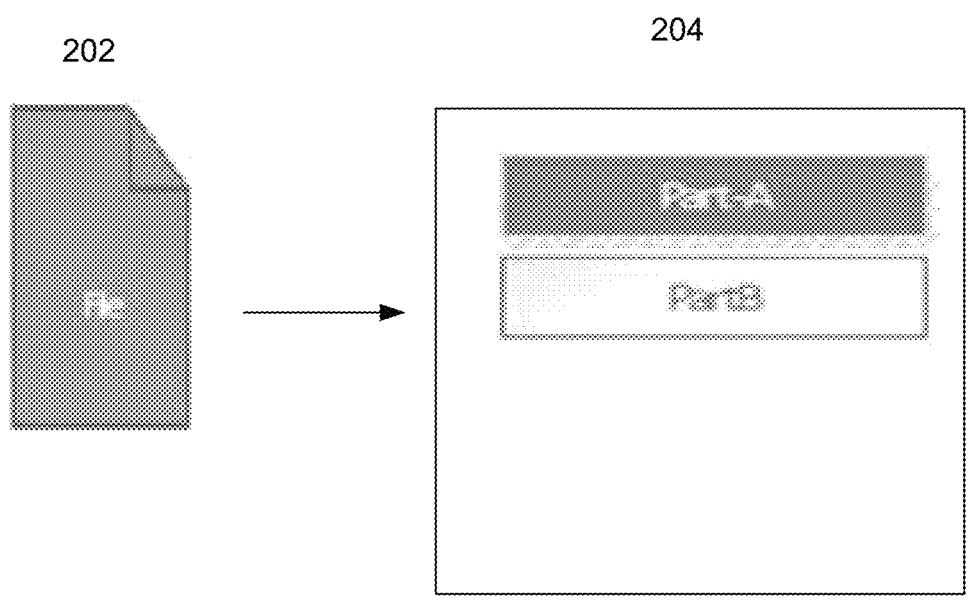
FIG. 2 depicts an example of a file having a plurality of parts at appropriate offsets that together represent the complete file in accordance with some embodiments.

In some embodiments, each file 202 includes one or more parts 204 at appropriate offsets that together represent the complete file as shown by the example in FIG. 2. Each part 204 is a chunk of data that can be variable in size and can be represented by a unique identifying hash value (e.g., MD5-SHA1-SIZE) as its part key. When a file 202 is requested and accessed by the client agent 102, the entire file or one or more parts of it may be stored on the local host and/or the CA 104 associated with the client agent 102 before the file is synchronized to the cloud storage 106. No two similar parts of a file are redundantly stored in the cloud storage 106 so that all files under the multi-tiered hybrid storage mechanism are de-duplicated.

In some embodiments, every part 204 of the file 202 being accessed may have a reference count, indicating how many users are accessing it via their respective client agents 102, and a part is removed from the local host and/or the CA 104 when its reference count goes to zero, indicating that the part is no longer accessed by the client agents 102 and has been synchronized to the cloud storage 106 by the CA 104. In some embodiments, each file 202 may further include metadata of the file, which describes the current state of the file, e.g., size, time of creation, version, status (modified or not), and action to be taken on the file.

In some embodiments, the maximum size of every part in a file 202 is the same (e.g., 1 MB) by convention. In some embodiments, however, a larger part size is chosen (e.g., 5 MB), wherein such choice is only made if the file is known to be of large size before any data is written to it since combining the parts and rehashing them all when the file grows too large would be cumbersome and slow.

In the example of FIG. 1, client agent 102 is a software program/application running on a user's local host, wherein the client agent 102 is configured to synchronize with and to request access to files maintained in the cloud storage 106 via the CA 104. During its operation, the client agent 102 is configured to first request the IP address of the CA 104 from the cloud storage 106. Here, the IP address of the CA 104 reflects the location of the CA 104, wherein the IP address can be either an internal IP address if the CA 104 is located within the same internal network (or intranet) as the local host of the client agent 102 behind a firewall or a public IP address accessible by the client agent 102 over a network. In some embodiments, the client agent 102 is configured to provide its authentication information to the cloud storage 106 along the request for the IP address of the CA 104. Upon authenticating the client agent 102, the cloud storage 106 is configured to provide the client agent 102 with the IP address of the CA 104 that is configured to store and manage the files for the client as part of the multi-tiered hybrid storage mechanism. The client agent 102 then attempts to establish a connection with the CA 104 at the provided IP address directly to avoid any issues with broadcasts of messages or networks that do not allow UDP packets to cross. In some embodiments, the client agent 102 is configured to establish a secured connection with the CA 104 especially if when the CA 104 is located on a public network outside of the firewall of the internal network of the client agent 102. In some embodiments, the cloud storage 106 is configured to broker an authentication token with the client agent 102 and the CA 104, wherein the authentication token can be used to authenticate both the client agent 102 and the CA 104 before either of the end points allows data traffic (a file or one or more parts of the file) to be transmitted over the connection. Once the secured connection between the client agent 102 and the CA 104 has been established and both parties have been authenticated, files (and/or one or more of their parts) and their metadata can be communicated and exchanged between the two parties.

Figure 3:
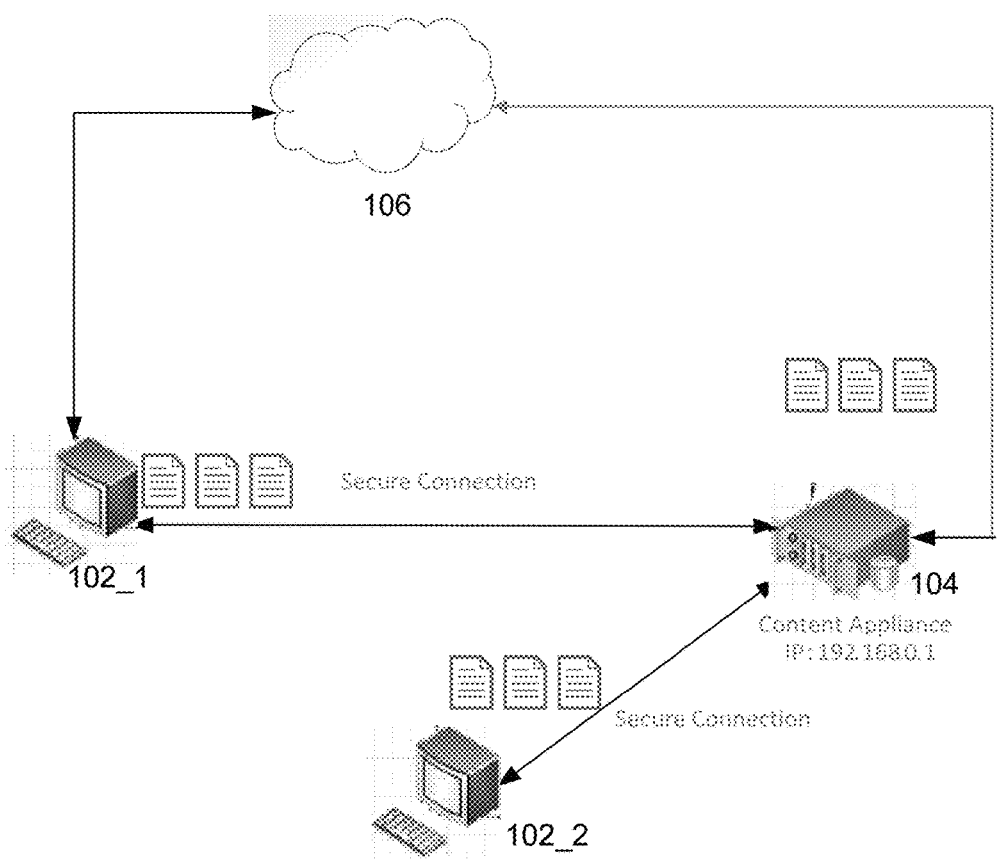
FIG. 3 depicts an example of a CA configured to serve more than one client agents running on different local hosts in accordance with some embodiments.

In some embodiments, the CA 104 is configured to serve more than one client agents 102s running on different local hosts as shown in the example depicted in FIG. 3. Under the configuration in FIG. 3, the CA 104 is configured to maintain and manage files for multiple client agents 102s by establishing separate secured connections with the client agents 102s. In some embodiments, the CA 104 is configured to keep the files belonging to different client agents 102s separately and one client agent 102_1 may not access files that belong to another client agent 102_2 without access permission by the client agent 102_2. In some embodiments, where the files accessed or requested by the client agents 102s overlap, meaning one file is accessed or requested by both of them at the same time, the CA 104 is configured to maintain only one copy of the file and its parts to be shared by both client agent 102_1 and client agent 102_2 to avoid any potential duplication.

When the client agent 102 attempts to access a file 202 (or part of it) for a read or write operation, a list of part keys of the file is referenced. Based on the offset and size of the operation, the necessary parts 204 for the file 202 can be determined. If the parts already exist locally, they are read from disk (or in-memory LRU cache) of the local host and provided to the client agent 102. If the file and/or its parts are not available on its local host, the client agent 102 is configured to request parts or the entire file from the CA 104 instead of the cloud storage 108. In some cases, the file and/or its parts already exists on the CA 104. For a non-limiting example, the same file has been previously requested by another client agent that shares the same CA 104 and has been downloaded from the cloud storage 106. Under such scenario, the CA 104 is configured to provide the file and/or its parts to the requesting client agent 102 without the client agent 102 having to download the file and/or parts from the cloud storage 106 again.

In some embodiments, where the CA 104 does not have a copy of the file and/or its parts, the CA 104 is configured to communicate with other client agents 102s that it serves to discover if any of the local hosts of those client agents 102s maintain a copy of the same file and/or its parts that can be shared with the requesting client agent. If so, the CA 104 is configured to retrieve the copy of the file and/or its parts from the other client agent, keep the copy on the CA 104, and provide the retrieved copy of the file and/or its parts to the requesting client agent 102. In some alternative embodiments, the CA 104 is configured to only retrieve and provide metadata of the file and/or its parts to the requesting client agent 102, which then requests and retrieves the file and/or its parts directly from the other client agent 102 that currently has it. If neither the CA 104 not any of the client agents 102s it serves has a copy of the file and/or its parts, the CA 104 is configured to request the file and/or its parts from the cloud storage 106, keep a copy of the file and/or its parts on the CA 104, and provide a copy of the file and/or its parts to the requesting client agent 102. The cloud storage 106 will then update the information on which client agents 102s and/or CA 104 now have a copy of the file.

After the requesting client agent 102 has obtained a copy of the file and/or its parts locally, the same file and/or its parts may be revised by another client agent 102 and uploaded to the cloud storage 106. To ensure that the requesting client agent 102 has the most up-to-date version of the file and/or its parts to work with, in some embodiments, the cloud storage 106 is configured to provide newly updated metadata of the file to the CA 104 serving with the requesting client agent 102 once the file and/or its parts has been updated, wherein the metadata reflects the latest changes made to the file and/or its parts. The cloud storage 106 is also configured to notify the requesting client agent 102 that the file and/or parts it possesses has been updated and a new metadata is available. The client agent 102 is then configured to request the updated metadata from the CA 104, identify the parts of the file that have been revised, and retrieve the latest version of the file and/its parts from the CA 104 or another client agent 102 as discussed above. In some embodiments, the CA 104 may need to pull the updated parts of the file and/or its parts from the cloud storage 106 if needed so that the copy of the file and/or parts it maintains is always in sync with and accurately reflects the current state of the authoritative copy of the file at the cloud storage 106.

When a user performs a write operation to the file via the client agent 102, one or more parts of the file may be revised or modified. If the write would span the entire length of a part, a blank piece of data is allocated for the part instead. If the write would extend beyond the last existing part, that part is extended up to a specific size. If it would extend even further, a new blank part is allocated to make up the remainder up to the specific size. As such, multiple blank parts may be needed for the write operation.

In some embodiments, changes made through the client agent 102 are immediately evident and presented to the user without requiring the changes being authorized by and uploaded to the cloud storage 106 first. In some embodiments, one or more events are created that represent changes made to the parts compared to their original states, wherein the changes need to be synchronized between the client agent 102 and the cloud storage 106. In some embodiments, each event can be an entry/row in a local file DB associated with a list of part keys representing local changes to the parts in the file.

In some embodiments, the client agent 102 is configured to transmit the events, the updated metadata, and all parts of the file that have been revised to the CA 104. Once the CA 104 acknowledges the receipt of the metadata and the parts of the file, the user at the client agent 102 regards the changes to the file have been fully committed and synchronized to the cloud storage 106. In the meantime, the CA 104 is configured to synchronize the metadata and the parts of the file to the cloud storage 106 in the background by processing the events and entries created by the client agent 102 during the write operation. In some embodiments, the CA 104 is configured to perform de-duplication operation of the parts of the file to be synchronized so that only a single copy of any part of the file is kept on the CA 104 or synchronized to the cloud storage 106. In some embodiments, the cloud storage 106 is configured to send an acknowledgment to the CA 104 and/or the client agent 102 once the metadata and/or parts of the file have been synchronized and authorized by the cloud storage 106. If the user makes further modification to the parts of the file after the initial events or entries have been created but before the previous changes have been synchronized to and acknowledged by the cloud storage 106, new events and entries may be created by the client agent 102 to reflect the latest changes to the file, wherein the new events are processed by the CA 104 and synchronized to the cloud storage 106.

After the updated file has been synchronized and authorized, the cloud storage 106 is configured to notify all other client agents accessing the same file that a change to the file has occurred. The other client agents then download or retrieve the new metadata and parts of the file that have changed from the cloud storage 106, or their associated CA 104, or directly from the client agent 102 where the changes have been made directly as described above. By "playing back"/synchronizing the changes in the order that they occurred, the client agents guarantee that the local version of the file contains the same up-to-date information as maintained in the cloud storage 106.

When a user access a file via the client agent 102, performance can be greatly enhanced if the parts of the file are already available locally. The storage space on the local host of the client agent 102, however, is often very limited. In some embodiments, the CA 104 is configured to prefetch or cache a file according to its caching priority/policy, which for non-limiting examples, can be based on preference and/or prior file access history of the file, how often the file was accessed or modified, when the file was last accessed or modified, whether the file is currently accessed or modified, or if the user has flagged the file as pinned, meaning that the file has been requested to be permanently cached by the system. For example, a file that is frequently or most recently accessed by the client agent 102 should have a high caching priority, meaning that the file should be prefetched into the CA 104 from the cloud storage 106 in anticipation of it being requested by the client agent 102 even before such request is made by the client agent 102. As such, the CA 104 functions as a "never full" cache for the client agent 102.

In some embodiments, cached files are prioritized based on their current states. If a file is opened for modification, its file caching priority is high. If the file is not open, or has not been modified or accessed recently, it has a low priority. If the file is not open, is not pinned, or cannot fit in the allotted storage amount specified in the policy, its priority is zero and it will not be cached. Anything which has not least modified or the oldest modified file will be un-cached and the newly modified file will be cached according to caching priority/policy. In some embodiments, the caching priority/policy may also be influenced by access history and interest by users associated with other client agents, which may also access the same file on the CA 104.

In some embodiments, the CA 104 is configured to either fully cache a file (meaning all of its parts are cached in the CA 104) or partially cache a file (meaning only a subset of its parts are cached in the CA 104). The knowledge of the list of parts being cached is always keeps up to date in the CA 104. Anytime a change to a file being cached by the CA 104 is detected in the cloud storage 106, the CA 104 is configured to download a list of new parts and metadata of the file and the corresponding parts of the same file previously downloaded are de-duplicated and removed from the CA 104.

Figure 4:
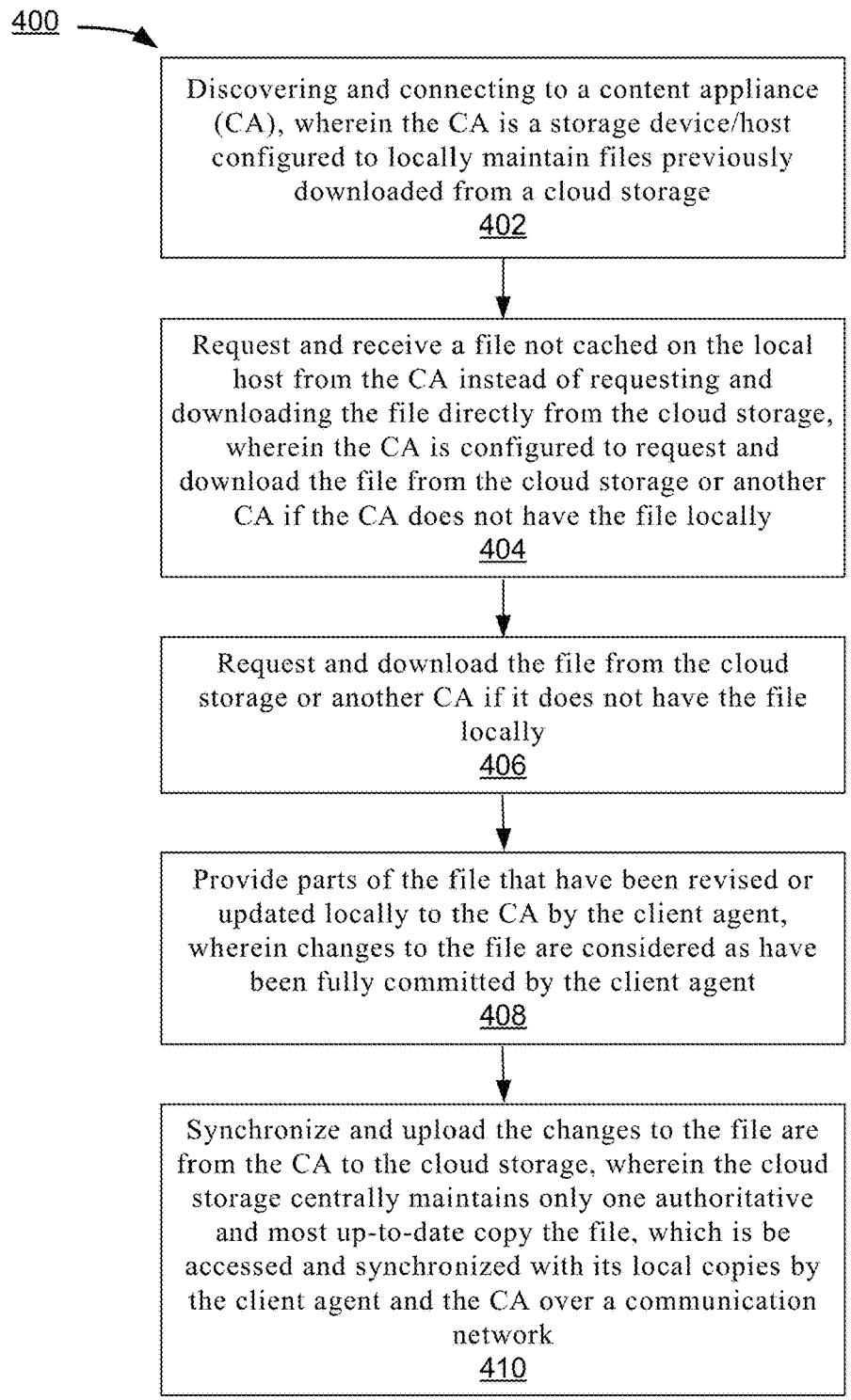
FIG. 4 depicts a flowchart of an example of a process to support file synchronization and sharing with cloud storage via a content appliance in accordance with some embodiments.

FIG. 4 depicts a flowchart 400 of an example of a process to support file synchronization and sharing with cloud storage via a content appliance. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where a content appliance (CA) is discovered by and connected to a client agent running at a local host, wherein the CA is a storage device/host configured to locally maintain files previously downloaded from a cloud storage. The flowchart 400 continues to block 404, where a file that is not stored on its local host is requested and received from the CA to the client agent instead of requesting and downloading the file directly from the cloud storage. The flowchart 400 continues to block 406, where the CA is configured to request and download the file from the cloud storage or another CA if it does not have the file locally. The flowchart 400 continues to block 408, where parts of the file that have been revised or updated locally are provided to the CA by the client agent, wherein changes to the file are considered as have been fully committed by the client agent. The flowchart 400 ends at block 410 where the changes to the file are synchronized and uploaded from the CA to the cloud storage, wherein the cloud storage centrally maintains only one authoritative and most up-to-date copy of the file, which is be accessed and synchronized with its local copies by the client agent and the CA over a communication network.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A system to support file synchronization and sharing with cloud storage, comprising:
   a client agent running on a local host configured to
   discover and connect to a content appliance (CA) by first requesting an Internet Protocol (IP) address of the CA from the cloud storage,
   wherein the CA is a storage device/host configured to locally maintain files previously downloaded from the cloud storage,
   wherein the IP address of the CA is either an internal IP address if the CA is located within the same internal network as the local host of the client agent behind a firewall or a public IP address accessible by the client agent over a network;
   request and receive a file not stored on the local host from the CA instead of requesting and downloading the file directly from the cloud storage;
   provide the file that has been revised or updated locally to the CA, wherein changes made to the file are considered as to have been fully committed by the client agent;
   said content appliance (CA) configured to:
   serve multiple client agents running on different local hosts by establishing separate secured connections with the multiple client agents, wherein the multiple client agents comprise the client agent, and
   request and download the file from the cloud storage or another CA or another client agent of the multiple client agents if the CA does not have the file locally; and
   synchronize the changes made to the file to the cloud storage, wherein the cloud storage centrally maintains only one authoritative and most up-to-date copy of the file, which is be accessed and synchronized with the file's local copies by the client agent and the CA over a communication network.

2. The system of claim 1, wherein:
   synchronizing the changes made to the file to the cloud storage does not require the client agent to keep running on the local host.

3. The system of claim 1, wherein:
   the file requested by the client agent is retrieved from the cloud storage only once by the CA.

4. The system of claim 1, wherein:
   the CA is available as a physical or virtual appliance and is either onsite with the local host in a same internal network or offsite on Internet.

5. The system of claim 1, wherein:
   the CA is configured to support local recovery for the client agent to access files of the CA even when an external network outage when the access to the cloud storage is not available.

6. The system of claim 1, wherein:
   the file includes one or more parts at offsets that together represent the complete file, wherein each of one or more parts is a chunk of data that can be variable in size and represented by a unique identifying hash value as a part key of each of the one or more parts.

7. The system of claim 6, wherein:
   every part of the file being accessed has a reference count, indicating how many users are accessing the part of the file via their respective client agents, and a part is removed from the local host and/or the CA when the reference count of the part of the file goes to zero, indicating that the part is no longer accessed by the client agents and has been synchronized to the cloud storage by the CA.

8. The system of claim 1, wherein:
   the client agent is configured to establish a secured connection with the CA that stores and manages the file at the IP address directly to avoid broadcasting of messages or networks that do not allow UDP packets to cross once the client agent is authenticated by the cloud storage.

9. The system of claim 8, wherein:
   the cloud storage is configured to broker an authentication token with the client agent and the CA, wherein the authentication token is used to authenticate both the client agent and the CA before either of them allows the file and/or the file's metadata to be transmitted over the connection.

10. The system of claim 1, wherein:
    the CA is configured to maintain and manage one or more files belonging to different client agents separately and a first client agent cannot access files that belong to a second client agent with access permission by the second client agent.

11. The system of claim 10, wherein:
    the CA is configured to maintain only one copy of the file and parts of the file to be shared by the multiple client agents when the file is requested by two or more of them simultaneously to avoid any duplication.

12. The system of claim 11, wherein:
    the CA is configured to provide the file and/or parts of the file to a requesting client agent without the client agent having to download the file and/or the parts of the file from the cloud storage again if a same file has been previously requested by the another client agent that shares a same CA and has been downloaded from the cloud storage.

13. The system of claim 1, wherein:
    the CA is configured to communicate with and retrieve a copy of the file and/or parts of the file from the another client agent it serves if the CA does not have a copy of the file and/or the parts of the file, keep the copy on the CA, and provide the retrieved copy of the file and/or the parts of the file to a requesting client agent.

14. The system of claim 13, wherein:
    the CA is configured to retrieve and provide only metadata of the file and/or parts of the file to the requesting client agent, which then requests and retrieves the file and/or the parts of the file directly from the another client agent that currently has the file.

15. The system of claim 1, wherein:
    the cloud storage is configured to provide newly updated metadata of the file to the CA serving with the requesting client agent once the file and/or parts of the file have been updated, wherein the metadata reflects the latest changes made to the file and/or the parts of the file to ensure that a requesting client agent has the most up-to-date version of the file and/or the parts of the file to work with.

16. The system of claim 15, wherein:
    the client agent is configured to request the updated metadata of the file from the CA, identify the parts of the file that have been revised, and retrieve the latest version of the file and/or the parts of the file from the CA or the another client agent.

17. The system of claim 1, wherein:
changes made through the client agent are immediately evident and presented to the user without requiring the changes being authorized by and uploaded to the cloud storage first.

18. The system of claim 1, wherein:
the CA is configured to perform de-duplication operation of the file to be synchronized, and keep only one single copy of any part of the file on the CA or synchronized to the cloud storage.

19. The system of claim 1, wherein:
the CA is configured to prefetch or cache the file according to a caching priority/policy of the file, which is based on one or more of preference and/or prior file access history of the file, how often the file was accessed or modified, when the file was last accessed or modified, whether the file is currently accessed or modified, or if the file is marked as pinned, meaning that the file has been requested to be permanently cached by the system.

20. The system of claim 19, wherein:
the files is prioritized and cached based on a current state of the file.

21. The system of claim 19, wherein:
the CA is configured to either fully cache the file where all parts of the file are cached in the CA or partially cache the file where only a subset of the parts of the file are cached in the CA.

22. A computer-implemented method to support file synchronization and sharing with cloud storage, comprising:
discovering and connecting to a content appliance (CA) by a client agent running on a local host requesting an Internet Protocol (IP) address of the CA from the cloud storage, wherein the CA is a storage device/host configured to locally maintain files previously downloaded from the cloud storage, wherein the IP address of the CA is either an internal IP address if the CA is located within the same internal network as the local host of the client agent behind a firewall or a public IP address accessible by the client agent over a network;
requesting and receiving a file not stored on the local host from the CA instead of requesting and downloading the file directly from the cloud storage, wherein the CA is configured to:
serve multiple client agents running on different local hosts by establishing separate secured connections with the multiple client agents, wherein the multiple client agents comprise the client agent, and
request and download the file from the cloud storage or another CA or another client agent of the multiple client agents if the CA does not have the file locally;
providing the file that has been revised or updated locally to the CA, wherein changes made to the file are considered as to have been fully committed by a client; and
synchronizing the changes made to the file to the cloud storage, wherein the cloud storage centrally maintains only one authoritative and most up-to-date copy of the file, which is be accessed and synchronized with the file's local copies by the client agent and the CA over a communication network.

23. The method of claim 22, further comprising:
synchronizing the changes made to the file to the cloud storage without requiring the client agent to keep running on the local host.

24. The method of claim 22, further comprising:
supporting local recovery for the client agent to access files of the CA even when an external network outage when the access to the cloud storage is not available.

25. The method of claim 22, further comprising:
establishing a secured connection with the CA that stores and manages the file at the IP address directly to avoid broadcasting of messages or networks that do not allow UDP packets to cross once the client agent is authenticated by the cloud storage.

26. The method of claim 25, further comprising:
brokering an authentication token with the client agent and the CA, wherein the authentication token is used to authenticate both the client agent and the CA before either of them allows the file and/or the file's metadata to be transmitted over the connection.

27. The method of claim 22, further comprising:
maintaining and managing one or more files belonging to different client agents separately and a first client agent cannot access files that belong to a second client agent with access permission by the second client agent.

28. The method of claim 27, further comprising:
maintaining only one copy of the file and parts of the file to be shared by the multiple client agents when the file is requested by two or more of them simultaneously to avoid any duplication.

29. The method of claim 28, further comprising:
providing the file and/or parts of the file to a requesting client agent without the client agent having to download the file and/or parts of the file from the cloud storage again if a same file has been previously requested by the another client agent that shares a same CA and has been downloaded from the cloud storage.

30. The method of claim 22, further comprising:
communicating with and retrieving a copy of the file and/or parts of the file from the another client agent it serves if the CA does not have a copy of the file and/or the parts of the file, keep the copy on the CA, and provide the copy of the file and/or the parts of the file to a requesting client agent.

31. The method of claim 30, further comprising:
retrieving and providing only metadata of the file and/or parts of the file to the requesting client agent, which then requests and retrieves the file and/or the parts of the file directly from the another client agent that currently has the file.

32. The method of claim 22, further comprising:
providing newly updated metadata of the file to the CA serving with the requesting client agent once the file and/or parts of the file have been updated, wherein the metadata reflects the latest changes made to the file and/or the parts of the file to ensure that a requesting client agent has the most up-to-date version of the file and/or the parts of the file to work with.

33. The method of claim 32, further comprising:
requesting the updated metadata of the file from the CA, identify the parts of the file that have been revised, and retrieve the latest version of the file and the parts of the file from the CA or the another client agent.

34. The method of claim 22, further comprising:
performing de-duplication operation of the file to be synchronized, and keeping only one single copy of any part of the file on the CA or synchronized to the cloud storage.

35. The method of claim 22, further comprising:
prefetching or caching the file according to a caching priority/policy of the file, which is based on one or more of preference and/or prior file access history of the file, how often the file was accessed or modified, when the file was last accessed or modified, whether the file is currently accessed or modified, or if the file is marked as pinned, meaning that the file has been requested to be permanently cached by the system.

36. The method of claim 35, further comprising:
either fully caching the file where all parts of the file are cached in the CA or partially caching the file where only a subset of the parts of the file are cached in the CA.

\* \* \* \* \*